(12) United States Patent
Philipson et al.

(10) Patent No.: US 11,282,050 B2
(45) Date of Patent: Mar. 22, 2022

(54) SYSTEM AND METHOD FOR PROVIDING LOCATION BASED SERVICES FOR USER-FEE CHARGEABLE FACILITIES

(71) Applicant: Cognizant Technology Solutions India Pvt. Ltd., Chennai (IN)

(72) Inventors: Alfred Philipson, Cedar Park, TX (US); Kabali Ganesan, Trichy (IN); Paul Godwin, Woodbury, MN (US); Alok Magan, Medina, MN (US)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 188 days.

(21) Appl. No.: 16/156,505

(22) Filed: Oct. 10, 2018

(65) Prior Publication Data
US 2020/0065784 A1    Feb. 27, 2020

(30) Foreign Application Priority Data
Aug. 21, 2018   (IN) .............................. 201841031281

(51) Int. Cl.
*G06Q 20/10*   (2012.01)
*G06Q 30/02*   (2012.01)
*G06Q 20/22*   (2012.01)

(52) U.S. Cl.
CPC ......... *G06Q 20/102* (2013.01); *G06Q 20/227* (2013.01); *G06Q 30/0233* (2013.01); *G06Q 20/29* (2013.01)

(58) Field of Classification Search
CPC ........... G06Q 30/0261; G06Q 30/0205; G06Q 20/16; G06Q 20/32; G06Q 20/325;
(Continued)

(56) References Cited

U.S. PATENT DOCUMENTS

| | | | |
|---|---|---|---|
| 7,587,363 B2 * | 9/2009 | Cataline ................. | G06Q 20/00 705/35 |
| 8,118,223 B2 * | 2/2012 | Hammad ........... | G06Q 20/3227 235/384 |

(Continued)

OTHER PUBLICATIONS

R. F. Cunningham, "Smart card applications in integrated transit fare, parking fee and automated toll payment systems—the MAPS concept," Conference Proceedings National Telesystems Conference 1993, 1993, pp. 21-25, doi: 10.1109/NTC.1993.293015. (Year: 1993).*

(Continued)

*Primary Examiner* — Bruce I Ebersman
*Assistant Examiner* — Steven R Chism
(74) *Attorney, Agent, or Firm* — Cantor Colburn LLP (57) ABSTRACT

A system and method for providing location based services for user-fee chargeable facilities is provided. The invention provides for detecting location, and offering and charging for usage of user-fee chargeable facilities. The invention further provides a convenient and common platform for offering user-fee chargeable services from different organizations. Furthermore, the invention provides a system and method that facilitates payment of fees through multiple payment channels, provides opportunities for using accumulated loyalty points in lieu of payments, availing personalized discounts and/or offers in lieu of financial payments and provides options for sharing the payment of fees between multiple users. The invention also provides a system and method that helps facility owners and operators and third party partners to reduce costs and increase revenue leveraging location-based services.

6 Claims, 4 Drawing Sheets

(58) Field of Classification Search
CPC ........... G06Q 30/0222; G06Q 20/0655; G06Q 30/0233; G06Q 20/102; G06Q 20/227; G06Q 20/29; G08B 21/0269; H04W 4/021; H04W 4/02; H04W 4/025; H04W 4/185; H04M 1/72572; H04M 2242/14; H04M 2242/30; H04M 2250/10; H04M 15/8033; H04L 67/22; H04L 67/306; H04L 61/609; H04L 51/20
See application file for complete search history.

(56) References Cited

U.S. PATENT DOCUMENTS

| | | | |
|---|---|---|---|
| 8,473,332 B2 | 6/2013 | Robinson | |
| 8,781,923 B2 * | 7/2014 | Pitroda | G06Q 20/3674 705/30 |
| 9,595,139 B1 * | 3/2017 | Breed | G07B 15/063 |
| 2012/0030045 A1 * | 2/2012 | Smith, III | G06Q 20/207 705/19 |
| 2012/0215594 A1 * | 8/2012 | Gravelle | G07B 15/02 705/13 |
| 2013/0006725 A1 * | 1/2013 | Simanek | G07B 15/063 705/13 |
| 2013/0018705 A1 * | 1/2013 | Heath | G08G 1/14 705/13 |
| 2014/0025444 A1 * | 1/2014 | Willis | G06Q 20/3272 705/13 |
| 2015/0088618 A1 * | 3/2015 | Basir | G07B 15/063 705/13 |
| 2015/0134428 A1 * | 5/2015 | Li | G07B 15/063 705/13 |
| 2016/0055466 A1 | 2/2016 | Du | |
| 2016/0171787 A1 * | 6/2016 | Yohalashet | G07B 15/063 705/13 |
| 2018/0012427 A1 * | 1/2018 | Ricci | B60W 40/08 |
| 2018/0061143 A1 * | 3/2018 | Nelson | G06Q 20/3278 |
| 2019/0344672 A1 * | 11/2019 | Pandhi | B60L 53/00 |
| 2020/0034813 A1 * | 1/2020 | Calinog | G06Q 20/22 |

OTHER PUBLICATIONS

Nandhini, S., et al.; "Automatic Toll Gate System Using Advanced RFID and GSM Technology"; International Journal of Advanced Research in Electrical, Electronics and Instrumentation Engineering, vol. 3, Issue 11, Nov. 2014 (http://www.rroij.com/open-access/automatic-toll-gate-system-using-advancedrfid-and-gsm-technology.php?aid=43730).

* cited by examiner

SYSTEM AND METHOD FOR PROVIDING LOCATION BASED SERVICES FOR USER-FEE CHARGEABLE FACILITIES

CROSS REFERENCE TO RELATED APPLICATION

This application is related to and claims the benefit of Indian Patent Application Number 201841031281 filed on Aug. 21, 2018, the contents of which are herein incorporated by reference in their entirety.

FIELD OF THE INVENTION

The present invention relates generally to providing location based services. More particularly, the present invention provides a system and method for providing location based services for user-fee chargeable facilities.

BACKGROUND OF THE INVENTION

Over the last few years, telecommunication technology has evolved manifolds. Electronic communication devices have become ubiquitous. Further, it has become very easy to track location of these devices using geolocation technologies. This has led to an increase in opportunities for geolocation based services.

Conventionally, systems and methods exist that rely on geolocation based sensing technology for providing location based services. However, these systems and methods suffer from several disadvantages. The existing systems and methods do not provide a convenient and common platform for aggregating payment collection for user fee chargeable facilities provided by various distinct facility providers. Further, the existing systems and methods permit payment of fees through limited payment channels only, do not provide opportunities for availing discounts or offers from nearby merchants and do not offer a means to share payments between multiple users.

In light of the above-mentioned disadvantages, there is a need for a system and method for providing location based services for user-fee chargeable facilities. Further, there is a need for a system and method that is able to accurately detect location and conveniently offer and charge for usage of user-fee chargeable facilities. Furthermore, there is a need for a system and method that provides a convenient and common platform for offering chargeable services from different organizations. Also, there is a need for a system and method that facilitates payment of fees through multiple payment channels, provides opportunities for using accumulated loyalty points in lieu of payments, availing discounts and/or offers and provides options for sharing payments between multiple users. In addition, there is a need for a system and method that helps facility providers and third party partners to reduce costs and increase revenue leveraging location based services.

SUMMARY OF THE INVENTION

A system for providing location based services for user-fee chargeable facilities is provided. In various embodiments of the present invention, the system comprises a pricing module configured to ascertain fees payable for using one or more user-fee chargeable facilities based on location of at least one of: one or more vehicles and one or more users. The location of the one or more vehicles and the one or more users is determined using one or more tracking devices having location determination capabilities. The system further comprises a communication channel interface configured to send one or more alerts, related to the fees payable, via one or more communication channels to at least one of: one or more electronic communication devices of the one or more users and one or more in-vehicle electronic communication devices. Furthermore, the system comprises a fee charging module configured to provide one or more payment options related to the fees payable via at least one of: the one or more electronic communication devices of the one or more users and the one or more in-vehicle electronic communication devices. Yet further, the fee charging module of the system is configured to prompt the one or more users to select a payment option from the one or more provided payment options; and finally transfer the payment, corresponding to the selected payment option, to one or more fee collecting entities.

In another embodiment of the present invention, the system comprises a pricing module configured to receive information related to usage of one or more user-fee chargeable facilities and corresponding fees payable from one or more fee collecting entities. Further, the system comprises a communication channels interface configured to send one or more alerts, related to the fees payable, via one or more communication channels to at least one of: one or more electronic communication devices and one or more in-vehicle electronic communication devices of one or more users of the one or more user-fee chargeable facilities. Furthermore, the system comprises a fee charging module configured to provide one or more payment options related to the fees payable via at least one of: the one or more electronic communication devices of the one or more users and the one or more in-vehicle electronic communication devices. Yet further, the fee charging module of the system is configured to prompt the one or more users to select a payment option from the one or more provided payment options; and finally transfer the payment, corresponding to the selected payment option, to the one or more fee collecting entities.

A computer-implemented method for providing location based services for user-fee chargeable facilities is provided. In various embodiments of the present invention, the computer-implemented method comprises determining location of at least one of: one or more vehicles and one or more users using one or more tracking devices having location determination capabilities. The method further comprises ascertaining fees payable for using one or more user-fee chargeable facilities based on the determined location. Further, the method comprises sending one or more alerts, related to the fees payable, via one or more communication channels to at least one of: one or more electronic communication devices of the one or more users and one or more in-vehicle electronic communication devices. Furthermore, the method comprises providing one or more payment options related to the fees payable via at least one of: the one or more electronic communication devices and the one or more in-vehicle electronic communication devices. Yet further, the method comprises prompting the one or more users to select a payment option from the one or more provided payment options. Finally, the method comprises transferring the payment, corresponding to the selected payment option, to one or more fee collecting entities.

In another embodiment of the present invention, the computer-implemented method comprises receiving information related to usage of one or more user-fee chargeable facilities and corresponding fees payable from one or more fee collecting entities. The method further comprises sending one or more alerts, related to the fees payable, via one or more communication channels to at least one of: one or more electronic communication devices of one or more users and one or more in-vehicle electronic communication devices. Further, the method comprises providing one or more payment options related to the fees payable via at least one of: the one or more electronic communication devices and the one or more in-vehicle electronic communication devices. Furthermore, the method comprises prompting the one or more users to select a payment option from the one or more provided payment options. Finally the method comprises transferring the payment received, corresponding to the selected payment option, to the one or more fee collecting entities.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for providing location based services for user-fee chargeable facilities is described herein. The invention provides a system and method that is able to accurately detect location and conveniently offer and charge for usage of user-fee chargeable facilities thereof. The invention further provides a convenient and common platform for offering user-fee chargeable services from different organizations. Furthermore, the invention provides a system and method that facilitates payment of fees through multiple payment channels, provides opportunities for using accumulated loyalty points in lieu of payments, availing personalized discounts and/or offers in lieu of financial payments and provides options for sharing the payment of fees between multiple users. The invention also provides a system and method that helps facility owners and operators and third party partners to reduce costs and increase revenue leveraging location-based services.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
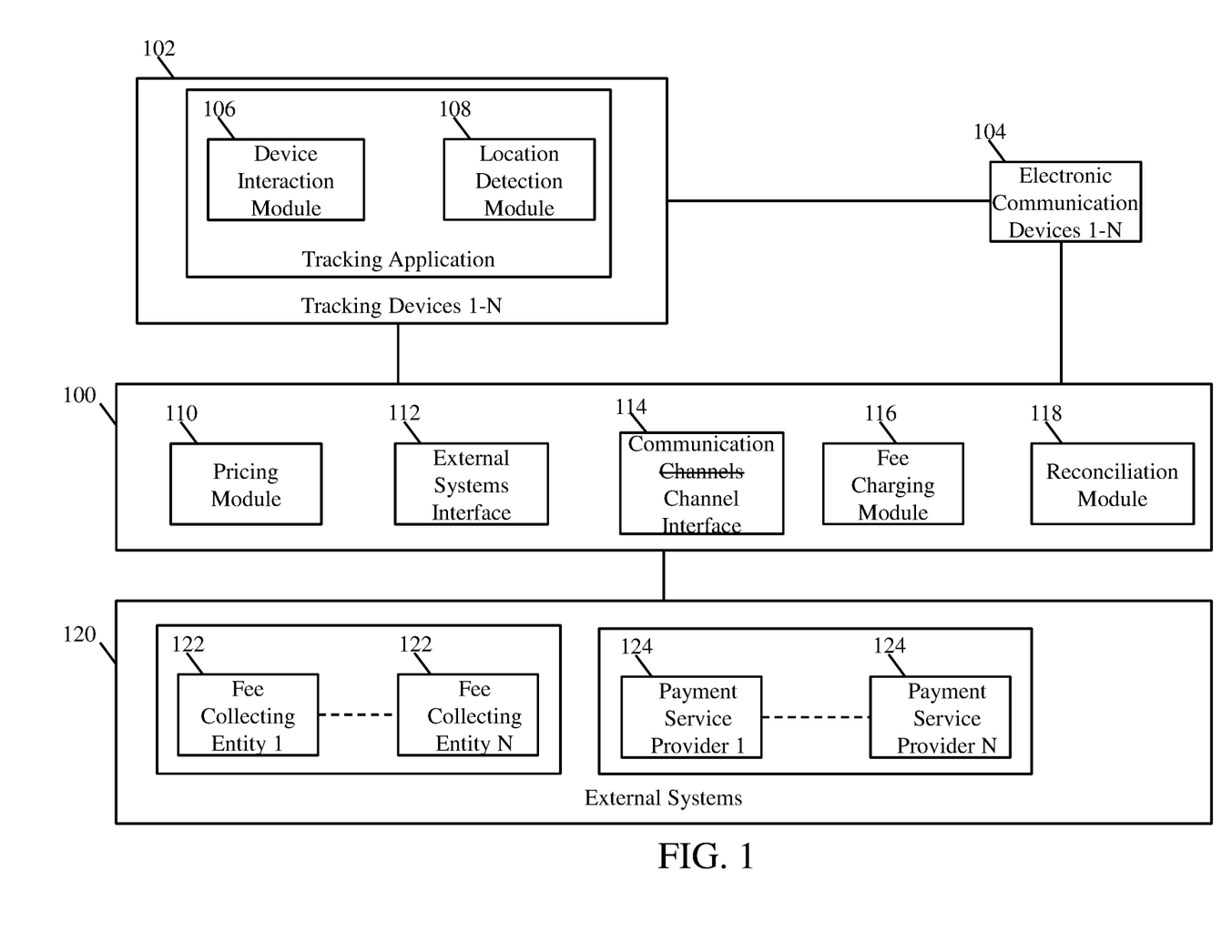
FIG. 1 is a block diagram illustrating a system for providing location based services for user-fee chargeable facilities, in accordance with an embodiment of the present invention.

FIG. 1 is a block diagram illustrating a system 100 for providing location based services for user-fee chargeable facilities, in accordance with an embodiment of the present invention. The system 100 comprises a pricing module 110, an external systems interface 112, a communication channel interface 114, a fee charging module 116 and a reconciliation module 118. Further, the system 100 communicates with one or more tracking devices 102, one or more electronic communication devices 104 and external systems 120. In an embodiment of the present invention, the external systems 120 comprise one or more fee collecting entities 122 and one or more payment service providers 124.

The one or more tracking devices 102 are electronic devices that are capable of determining location of one or more vehicles/one or more users. Further, the one or more users include, but not limited to, individuals/customers availing one or more location based services by paying a usage fee for chargeable facilities offered by one or more facility providers. Furthermore, the one or more location based services for user-fee chargeable facilities include, but not limited to, using toll roads, pay-per-mile based taxable infrastructure (incl. by public entities), parking lots, bridges, tunnels, metro stations, entertainment venues, parks and using transportation services such as ferries, buses and cabs. In an embodiment of the present invention, the location of the one or more vehicles/users is determined using one or more geolocation sensing technologies. The one or more geolocation sensing technologies include, but not limited to, Global Positioning System (GPS) and Global Navigation Satellite System. In an embodiment of the present invention, the one or more tracking devices 102 may interact with proximity devices such as, but not limited to, iBeacon, vehicle-to vehicle devices, vehicle-to-infrastructure devices and Bluetooth based low energy devices for determining location of the vehicle/user leveraging appropriate technologies. In an embodiment of the present invention, the one or more tracking devices 102 are either a distinct part of a vehicle or the vehicle itself. In an embodiment of the present invention, the one or more tracking devices 102 include, but not limited to, user devices, in-vehicle devices and any other devices capable of determining location. Further, the one or more user devices include, but not limited to, mobile phones, tablets wearable devices and laptops.

The one or more tracking devices 102 comprise a device interaction module 106 and a location detection module 108. In an embodiment of the present invention, the device interaction module 106 and the location detection module 108 reside within a tracking application installed on the one or more tracking devices 102. The device interaction module 106 facilitates interaction with various components of the tracking device 102. The location detection module 108 is configured to determine location of the tracking device 102. The tracking application is either pre-installed by a device manufacturer or is installed by one or more users of the one or more tracking devices 102. The tracking application facilitates communication between the tracking device 102 and components of the system 100 such as, but not limited to, the pricing module 110, the external systems interface 112, the communication channel interface 114 and the fee charging module 116 for providing location based services for user-fee chargeable facilities and payment options thereof.

In an embodiment of the present invention, the one or more tracking devices 102 and the one or more electronic communication devices 104 are separate devices. In another embodiment of the present invention, the one or more electronic communication devices 104 are also used as the one or more tracking devices 102 and vice versa. The one or more tracking devices 102 and the one or more electronic communication devices 104 are capable of using one or more communication methods and technologies such as, but not limited to, General Packet Radio Service (GPRS), 3G, 4G Long-Term Evolution (LTE), 5G, proximity sensors, Bluetooth, Wifi, any vehicle to vehicle communication methods and any vehicle to infrastructure communication methods. Further, the one or more electronic communication devices 104 include, but not limited to, mobile phones, tablets, wearable devices and laptops. Furthermore, the one or more electronic communication devices 104 are also capable of determining location. For instance, the one or more electronic communication devices 104 are equipped with geolocation sensing technologies thereby facilitating location detection. The tracking application may be installed either on the one or more tracking devices 102 or the one or more electronic communication devices 104 or both. On installing the tracking application, the one or more users are prompted to register by providing information such as, but not limited to, authentication information, user information, device information, vehicle information, financial information and permissions to access device's location information. In an embodiment of the present invention, the one more users can register via a web channel such as, but not limited to, a website and the application installed on the one or more electronic communication devices 104 or the one or more tracking devices 102. In an embodiment of the present invention, the one or more users can register using their accounts on partner platforms such as, but not limited to, Facebook and Gmail.

In an embodiment of the present invention, once the tracking application is installed and user registration is complete, the one or more users may access the tracking application and prompt the location detection module 108 to determine the location of the one or more tracking devices 102 by communicating with the geolocation sensing components of the one or more tracking devices 102. In another embodiment of the present invention, once the tracking application is installed, the tracking application runs in the background and the location detection module 108 continuously tracks the location of the vehicle/user. In another embodiment of the present invention, once the tracking application is installed, the tracking application runs in the background and the location detection module 108 tracks the location of the vehicle/user, in designated geographical areas through Geo-fencing.

The pricing module 110 is configured to ascertain, based on the determined location, the fees payable to the one or more facility providers for usage of user-fee chargeable facilities by the one or more users. In an embodiment of the present invention, the pricing module 110 comprise a database which stores information such as, but not limited to, details of service/facility providers and details of location based services offered along with usage fees chargeable for specific locations. The pricing module 110 ascertains the fees payable by the one or more users by querying the database and determining the services offered or used based on the determined location. The one or more location based services for user-fee chargeable facilities include, but not limited to, using toll roads, pay-per-mile based taxable infrastructure (incl. by public entities), parking lots, bridges, tunnels, metro stations, entertainment venues, parks and transportation services such as ferries, buses and cabs. In another embodiment of the present invention, the pricing module 110 interfaces with one or more external systems 120 via the external systems interface 112 and receives information related to usage of location based services of user-fee chargeable facilities and the fees payable in real-time or near real-time. Further, the information related to usage of location based services of user-fee chargeable facilities include, but not limited to, customer details, vehicle details such as make, model, year, color, jurisdiction and license plate number. The one or more external systems 120 include, but not limited to, the one or more fee collecting entities 122 such as toll collecting systems, parking management systems, public transportation billing systems, public taxation systems and any other systems of the facility providers offering location based services for user-fee chargeable facilities.

In an embodiment of the present invention, in case of proximity devices based implementation, when the one or more users run the tracking application on their electronic communication devices 104 or the tracking devices 102 and travel through or access a user-fee chargeable service area, then the tracking application monitors any communication/interaction between the electronic communication devices 104 or the tracking device 102 and the proximity devices of the facility provider providing the location based chargeable services. The pricing module 110 then identifies the user based on the communication with the proximity devices and ascertains fees payable by the user for the location based services. In an embodiment of the present invention, pricing module 110 references the one or more user fee tracking points and ascertains corresponding fee using geo-coded mapping solutions such as, but not limited to, Google Maps, Apple Maps and other mapping service providers or using the proximity devices.

In an alternate embodiment of the present invention, if a user who has completed the registration and is not carrying a tracking device 102 while accessing the user-fee chargeable facility, the one or more fee collecting entities 122 record transactions and share the usage information of the location based services related to the recorded transactions with the system 100 via the external systems interface 112. In another alternate embodiment of the present invention, information related to usage of location based services of the user-fee chargeable facilities and corresponding fees payable is received by the system 100 from the one or more fee collecting entities 122. In an embodiment of the present invention, the one or more fee collecting entities 122 are proprietary systems of the one or more facility providers that record transactions related to usage of location based services of user-fee chargeable facilities provided by them. Further, the recorded transactions are forwarded in the form of information related to usage of location based services of user-fee chargeable facilities and corresponding fees payable to the system 100.

The communication channel interface 114 is configured to send one or more alerts related to the fees payable to the one or more users. The communication channel interface 114 facilitates interaction with one or more communication channels to send the one or more alerts to the one or more electronic communication devices 104 or the one or more tracking devices 102. The one or more alerts sent via the one or more communication channels include, but not limited to, text messages via Short Message Service (SMS), smart assistant display or audio prompts, personal device smart assistants, in-vehicle smart assistants, instant messages via instant messenger applications such as WhatsApp and electronic mails. In an embodiment of the present invention, the one or more alerts consist of notifications such as, but not limited to, user vehicle or user device has accessed a chargeable service area or passed/parked in a parking lot or traveled on a road that has usage charges along with payment option or link to access payment options. In an embodiment of the present invention, the one or more alerts may be delivered in a manner and at a time that is non-obstructive to the driver of the vehicle.

The fee charging module 116 is configured to provide one or more payment options related to the fees payable via at least one of: the one or more electronic communication devices 104 and the one or more tracking devices 102 to the one or more users. The one or more payment options provided by the fee charging module 116 include, but not limited to, making payment using a new or existing option for electronic payment such as electronic wallets, cards and electronic banking, making payment using frequent driver miles or points accrued through customer loyalty or affinity programs, accepting personalized discount/promotional offer from third-party partner(s) that are selected by analytical methods leveraging the unique virtual identity of the user in order to maximize the chances of availing the offers, purchasing goods or services in lieu of payment, visiting a pre-defined location in lieu of payment, viewing an advertisement in lieu of payment, splitting payment between multiple users, deferring payment to a later date and time, and denying responsibility for the payment obligation and reporting the same to appropriate authority. In an embodiment of the present invention, the system 100 comprises a database that is capable of, but not limited to, creating user profiles and recording and storing all transactions corresponding to the one or more users in an appropriate manner. The fee charging module 116 is configured to query the database and provide payment options that may include offering rewards based on usage history and user profile created through the unique virtual identity of the user, using loyalty points or miles accrued and providing contextually relevant personalized offers and promotional schemes, with an objective to provide the right offer to the right person at the right time at the right place to maximize the chance of availing the offer. In an embodiment of the present invention, contextually relevant and personalized offers and promotional schemes are provided by leveraging the external systems interface 112 to interact with partners, source and offer discounts and promotional offers and match the user's virtual profile, user profile and present location using analytical methods. In an embodiment of the present invention, the virtual profile is created through Code Halo™. Further, Code Halo™ is a collection of user's behavioral patterns based on past user actions such as, but not limited to, every digital click, swipe, "like", buy, comment, deposit, jog and search which is further augmented through interfaces with third party data providers to collectively form a unique virtual identity of the user. On providing the one or more payment options, the fee charging module 116 is further configured to prompt the one or more users to select an option from the one or more payment options related to the fees payable.

In an embodiment of the present invention, the fee charging module 116 provides options to the one or more users to pay fees ascertained by the pricing module 110 or the fees payable provided by the one or more fee collecting entities 122. Further, the fee charging module 116 also computes a revised fee payable based on, but not limited to, user's profile, user's virtual profile, frequency of trips, offers accepted and frequent driver miles. The fee charging module then provides payment options corresponding to the revised fee payable. In an embodiment of the present invention, the fee charging module 116 uses a proprietary pricing algorithm to determine the revised fee payable by the one or more users. Further, the fees payable ascertained by the pricing module 110 or the fees payable provided by the one or more fee collecting entities 122 is the amount due to the facility provider. The difference, if any, between the amount payable to the facility provider and the revised fees payable by the user is the result of discounts or offers opted by the user by selecting a specific payment option corresponding to the revised fees from the one or more payment options provided by the fee charging module 116. In an embodiment of the present invention, the fee charging module 116 interfaces with systems of third party partners to receive payments for settling the fees due to the one or more facility providers in case the one or more users select a specific option for availing discounts/offers provided by the third party partners. For example, the one or more users are provided an option to avail a discount on the toll road usage fee ascertained by the pricing module 110 by viewing an advertisement of a restaurant near the toll road. Once the one or more users select the option and view the advertisement, the fee charging module 116 determines a revised fee payable (which is a discounted fee) by the one or more users in lieu of viewing the advertisement. The fee charging 116 then prompts the one or more users to pay the revised fee and settles the remaining balance with the third party partner i.e. restaurant. The facility provider i.e. toll road operator is paid the ascertained fees (which is sum total of the revised fee paid by the user and remaining balance (discount) collected from the restaurant).

In an exemplary embodiment of the present invention, the fee charging module 116 provides options to the one or more users to split the fees payable to the facility provider between two or more users. For example, on selecting the option to split payment, the fee charging module 116 divides the fee payable based on a pre-determined ratio or provides options to the one or more users to enter a preferred ratio or uses a pre-defined criteria based on usage for splitting the fee payable to the facility provider. In an embodiment of the present invention, the fee charging module 116 is capable of authenticating additional users for splitting the fees payable by any appropriate authentication method such as, but not limited to, using One Time Passwords (OTPs) and receiving and verifying authentication details. In another embodiment of the present invention, the additional users for splitting the fees payable are not authenticated and are directly provided options for making payment. In yet another embodiment of the present invention, the additional users for splitting the fees payable are sent one or more alerts along with payment options by the communication channel interface 114.

In an embodiment of the present invention, once the one or more users select a specific option from the one or more payment options, the fee charging module 116 communicates with the one or more payment service providers 124 for processing the payment related to the ascertained fees based on the selected option. The fee charging module 116 then receives the payment, and transfers the payment due, as ascertained by the pricing module 110, to the respective fee collecting entity 122. In another embodiment of the present invention, once the one or more users select a specific payment option from the one or more payment options, the fee charging module 116 facilitates payment processing through the one or more payment service providers 124 and directly transfers the fee payable to the one or more fee collecting entities 122. In an embodiment of the present invention, the one or more fee collecting entities 122 include, but not limited to, intermediary systems that collect payment on behalf of the one or more facility providers or payment systems of the one or more facility providers providing location based chargeable services, such as, but not limited to, use of toll roads, pay-per-mile based taxable infrastructure (incl. by public entities), parking lots, bridges, tunnels, metro stations and transportation services such as ferries, buses and cabs. In an embodiment of the present invention, the fee charging module 116 is capable of transferring the payment due to the one or more fee collecting entities 122 in real-time, near real-time, periodically or as agreed upon by the facility provider providing the services.

In an embodiment of the present invention, if the user selects an option for making payment including customer loyalty and affinity program and incorporating discounts provided due to acceptance of the offered promotional offers, then the fee charging module 116 determines points accrued by the user and computes the number of points required to pay the outstanding fee. If the value of the points is equal to or greater than the amount due, then the points are converted into a financial payment through pre-defined conversion formulae and transferred via electronic interfaces to the fee collecting entity 122.

In an embodiment of the present invention, if the user selects an option to make payment by availing an offer or viewing an advertisement in lieu of making payment, then the fee charging module 116 considers various user attributes such as, but not limited to, user demographics, purchasing power, history and geographic location and displays contextually relevant and personalized offers or advertisements via the one or more electronic communications devices 104 or the one or more tracking devices 102 based on the considered attributes. Further, the fee charging module 116 converts the availed offer to a financial payment with respect to the ascertained fees payable using pre-defined conversion formulae and transfers the converted financial payment to the one or more fee collecting entities 122 via an electronic interface for paying the facility provider offering the location based service for chargeable facilities. Furthermore, the payment made to the facility provider is equivalent to the fees payable as ascertained by the pricing module 110 or the fees payable as received from the one or more fee collecting entities 122. In case the converted financial payment is less than the payment due, then the user is prompted to select the payment method for the remainder of the payment due.

The system 100 facilitates aggregating fee collecting entities 122 and provides a common platform for offloading payment processing and customer contact operations of organizations providing user-fee chargeable facilities thereby offering a single interface for collecting user-fee from users across multiple jurisdictions. Further, the system 100 permits the users across jurisdictions to use all participating user-fee chargeable facilities and pay using a single solution. Furthermore, the system 100 can be implemented at any level including, but not limited to, national and global.

In an embodiment of the present invention, the system 100 is capable of interfacing with one or more fee collecting entities 122 and receiving transaction files comprising information related to usage of the one or more user-fee chargeable facilities corresponding to one or more transactions recorded at the one or more fee collecting entities 122. The reconciliation module 118 then reconciles the usage of the one or more user-fee chargeable facilities, as reported by the tracking application and the transaction files comprising information related to usage of the one or more user-fee chargeable facilities corresponding to one or more transactions recorded at the one or more fee collecting entities 122. The one or more transactions are then matched and reconciled by the reconciliation module 118. In an embodiment of the present invention, the matching and reconciliation happens using appropriate descriptions related to the tracking device 102 and/or the corresponding tracking application and/or the vehicle or other descriptions as applicable. In an embodiment of the present invention, the descriptions related to the one or more tracking devices 102 comprise information such as, but not limited to, unique device identification number and vehicle details such as make, model, year, color, license plate number and jurisdiction of the vehicle.

If the transactions match, the system 100 processes each transaction corresponding to the received transaction files and facilitates debiting existing customer accounts or creating new accounts in absence of existing accounts. In an embodiment of the present invention, transaction files for each recorded transaction are associated with customer accounts using vehicle description which includes, but is not limited to, make, model, year, color, license plate number and jurisdiction of the vehicle captured by the fee collecting entities 122. Furthermore, the system 100 is capable of supplementing additional information related to the customer such as, but not limited to, customer's mobile number to the information provided by the one or more fee collecting entities and facilitating payment processing thereof.

If the one or more transactions reported by the tracking application from a registered user do not have a corresponding transaction from the fee collecting entity 122, the reconciliation module 118 re-attempts to match and reconcile transactions for a pre-defined period of time, before rejecting the transaction recorded by the tracking application 102. If the one or more transactions reported by the fee collecting entity 122 do not have a corresponding transaction from the tracking application 102 for a registered user, the reconciliation module 118 triggers a dispute process with the fee collecting entity 122.

Figure 2:
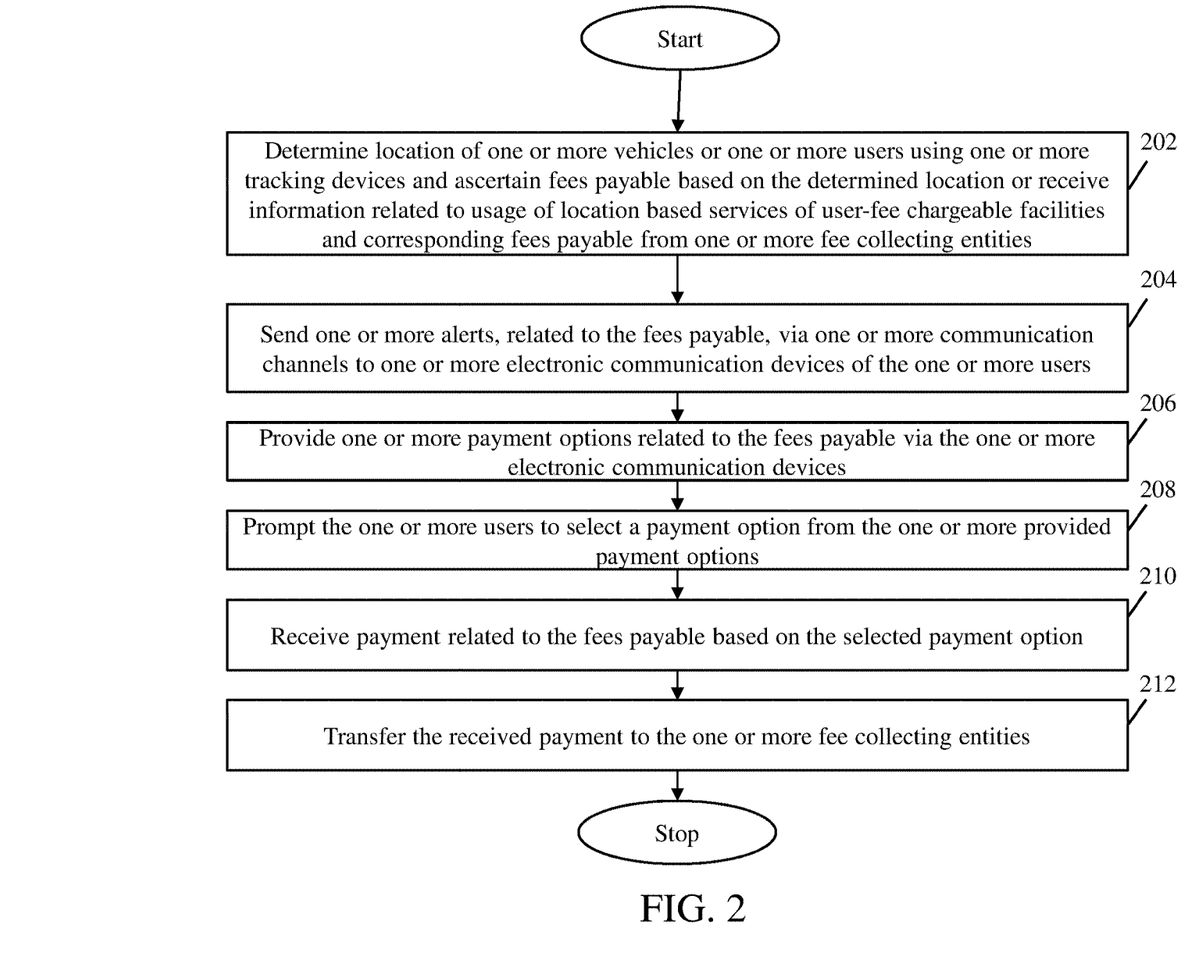
FIG. 2 is a flowchart illustrating a method for providing location based services for user-fee chargeable facilities, in accordance with an embodiment of the present invention.

FIG. 2 is a flowchart illustrating a method for providing location based services for user-fee chargeable facilities, in accordance with an embodiment of the present invention.

At step 202, location of one or more vehicles or one or more users is determined using one or more tracking devices. Further, fees payable based on the determined location is also ascertained. The one or more tracking devices are electronic devices that are capable of determining location of one or more vehicles/one or more users. The one or more users include, but not limited to, individuals/customers availing one or more location based services by paying a usage fee for chargeable facilities offered by one or more facility providers. Further, the one or more location based services for user-fee chargeable facilities include, but not limited to, using toll roads, pay-per-mile based taxable infrastructure (incl. by public entities), parking lots, bridges, tunnels, metro stations, entertainment venues and parks and using transportation services such as ferries, buses and cabs. In an embodiment of the present invention, the location of the one or more vehicles/users is determined using one or more geolocation sensing technologies. The one or more geolocation sensing technologies include, but not limited to, Global Positioning System (GPS) and Global Navigation Satellite System. In an embodiment of the present invention, the one or more tracking devices may interact with proximity devices such as, but not limited to, iBeacon, vehicle-to-vehicle, vehicle-to-infrastructure devices and Bluetooth based low energy devices for determining location of the vehicle/user leveraging appropriate technologies. In an embodiment of the present invention, the one or more tracking devices are either a distinct part of a vehicle or the vehicle itself. In an embodiment of the present invention, the one or more tracking devices include, but not limited to, user devices such as mobile devices, in-vehicle devices and any other device capable of determining location.

In an embodiment of the present invention, on determining the location of the one or more users or the one or more vehicles, a database is queried. The database comprises information such as, but not limited to, details of service/facility providers and details of location based services offered along with usage fees chargeable for specific locations. The services used are then determined along with the fees payable based on the determined location. The one or more location based services for user-fee chargeable facilities include, but not limited to, using toll roads, pay-per-mile based taxable infrastructure (incl. by public entities), parking lots, bridges, tunnels, metro stations, entertainment venues and parks and using transportation services such as ferries, buses and cabs. In another embodiment of the present invention, communication with one or more external systems via an external systems interface is initiated. Further, information related to usage of location based services of user-fee chargeable facilities and corresponding fees payable is received in real-time from the one or more external systems. The one or more external systems include, but not limited to, one or more fee collecting entities. The one or more fee colleting entities are systems of the one or more facility providers which facilitate and record transactions related to usage of location based services of user-fee chargeable facilities. The fee collecting entities include, but not limited to, toll collecting systems, parking management systems, public transportation billing systems, public taxation systems and any other systems of the facility providers offering location based services for user-fee chargeable facilities.

The one or more tracking devices comprise a device interaction module and a location detection module. In an embodiment of the present invention, the device interaction module and the location detection module reside within a tracking application installed on the one or more tracking devices. The device interaction module facilitates interaction with various components of the tracking device. The location detection module is configured to determine location of the one or more tracking devices. The tracking application is either pre-installed by device manufacturer or is installed by the one or more users of the one or more tracking devices. The tracking application facilitates providing location based services for user-fee chargeable facilities and providing payment options thereof. On installing the tracking application, the one or more users are prompted to register by providing information such as, but not limited to, authentication information, user information, device information, vehicle information, financial information and permissions to access device's location information. In an embodiment of the present invention, the one or more users can register via a web channel such as, but not limited to, a website and the installed tracking application. In an embodiment of the present invention, the one or more users can register using their accounts on partner platforms such as, but not limited to, Facebook and Gmail.

At step 204, one or more alerts related to the fees payable are sent via one or more communication channels to the one or more electronic communication devices of the one or more users. In an embodiment of the present invention, the one or more tracking devices and the one or more electronic communication devices are separate devices. In another embodiment of the present invention, the one or more electronic communication devices are also used as the one or more tracking devices and vice versa. Further, the one or more tracking devices and the one or more electronic communication devices are capable of using one or more communication methods and technologies such as, but not limited to, General Packet Radio Service (GPRS), 3G, 4G Long-Term Evolution (LTE), 5G, proximity sensors, Bluetooth, WiFI, any vehicle to vehicle communication methods and any vehicle to infrastructure communication methods. The one or more electronic communication devices include, but not limited to, mobile phones, tablets, wearable devices and laptops. Further, the one or more electronic communication devices are also capable of determining location. The tracking application may be installed either on the one or more tracking devices or the one or more electronic communication devices or both.

The one or more alerts sent via the one or more communication channels include, but not limited to, text messages via Short Message Service (SMS), smart assistant display or audio prompts, personal device smart assistants, in-vehicle smart assistants, instant messages via instant messenger applications such as WhatsApp and electronic mails. In an embodiment of the present invention, the one or more alerts consist of notifications such as, but not limited to, user vehicle or user device has accessed a chargeable service area or passed/parked in a parking lot or traveled on a road that has usage charges along with payment option or link to access payment options. In an embodiment of the present invention, the one or more alerts may be delivered in a manner and at a time that is non-obstructive to the driver of the vehicle.

At step 206, one or more payment options related to the fees payable are provided via the one or more electronic communication devices. The one or more payment options provided to the one or more users include, but not limited to, making payment using a new or existing option for electronic payment such as electronic wallets, cards and electronic banking, making payment using frequent driver miles or points accrued through customer loyalty or affinity programs, accepting personalized discount or promotional offer from third-party partner(s) that are selected by analytical methods leveraging the unique virtual identity of the user in order to maximize the chances of availing the offers, purchasing goods or services in lieu of payment, visiting a pre-defined location in lieu of payment, viewing an advertisement in lieu of payment, splitting payment between multiple users, deferring payment to a later date and time and denying responsibility for the payment obligation and reporting the same to appropriate authority.

In an embodiment of the present invention, the one or more users are provided an option to pay the entire fee payable to the facility provider. Further, the one or more users are also provided options to pay revised fees. The revised fees are computed based on, but not limited to, user's profile, user's virtual profile created through, but not limited to, Code Halo™, frequency of trips, offers accepted and frequent driver miles. In an embodiment of the present invention, a proprietary pricing algorithm is used to determine the revised fee payable by the one or more users. Further, the fees payable is the amount due to the facility provider. Furthermore, the difference, if any, between the fees payable to the facility provider and the revised fees payable by the user is the result of discounts or offers opted by the user by selecting a specific payment option from the one or more payment options. In an embodiment of the present invention, a fee charging module interfaces with systems of third party partners to receive payments for settling the fees due to the one or more facility providers in case the one or more users select a specific option for availing discounts/offers provided by the third party partners. For example, the one or more users are provided an option to avail a discount on the toll road usage fee payable to the facility provider i.e. the toll road operator by viewing an advertisement of a restaurant near the toll road. Once the one or more users select the option and view the advertisement, the fee charging module determines a revised fee payable (which is a discounted fee) by the one or more users in lieu of viewing the advertisement. The fee charging module then prompts the one or more users to pay the revised fee and settles the remaining balance with the third party partner i.e. restaurant. The toll road operator is paid the sum total of the revised fee paid by the user and remaining balance (i.e. discount offered to the user) collected from the restaurant for settling the fees payable for providing the services.

In an exemplary embodiment of the present invention, the one or more users are also provided payment options to split the fees payable to the facility provider between two or more users. For example, on selecting the option to split payment, the fee payable to the facility provider is divided based on a pre-determined ratio or options are provided to the one or more users to enter a ratio for division or a pre-defined criteria is used for splitting the fee amongst the two or more users. In an embodiment of the present invention, additional users for splitting the fees payable are authenticated by any appropriate authentication method such as, but not limited to, using One Time Passwords (OTPs) and receiving and verifying authentication details. In another embodiment of the present invention, the additional users for splitting the fees payable are not authenticated and are directly provided options for making payment. In yet another embodiment of the present invention, the additional users for splitting the fees payable are sent one or more alerts through the one or more communication channels along with payment options.

At step 208, the one or more users are prompted to select an option from the one or more payment options related to the fees payable. The one or more users select a specific option from the one or more payment options via the one or more electronic communication devices or the one or more tracking devices.

At step 210, payment related to the fees payable is received based on the selected option. In an embodiment of the present invention, the payment is received at the fee charging module. Once the one or more users select a specific option from the one or more payment options, the fee charging module communicates with one or more payment service providers for processing the payment related to the fees payable based on the selected option.

At step 212, the received payment is transferred to the respective one or more fee collecting entities. In an embodiment of the present invention, once the one or more users select a specific option from the one or more payment options, the fee charging module facilitates payment processing through the one or more payment service providers and transfers the fee payable to the one or more facility providers via the one or more fee collecting entities. The one or more fee collecting entities include, but not limited to, intermediary systems that collect payment on behalf of facility providers or the payment systems of the facility provider providing location based chargeable services, such as toll roads, pay-per-mile based taxable infrastructure (incl. by public entities), parking lots, bridges, tunnels, metro stations and transportation services such as ferries, buses and cabs. In an embodiment of the present invention, the payment is transferred to the fee collecting entities in real-time, near real-time, periodically or as agreed upon by the facility provider providing the services.

In an embodiment of the present invention, prior to transferring the payment due to the one or more fee collecting entities, the method comprises an additional step of reconciling the usage reported from the one or more fee collecting entities and the tracking application corresponding to the one or more tracking devices. The step of reconciliation of transactions is discussed in detail in conjunction with FIG. 3.

Figure 3:
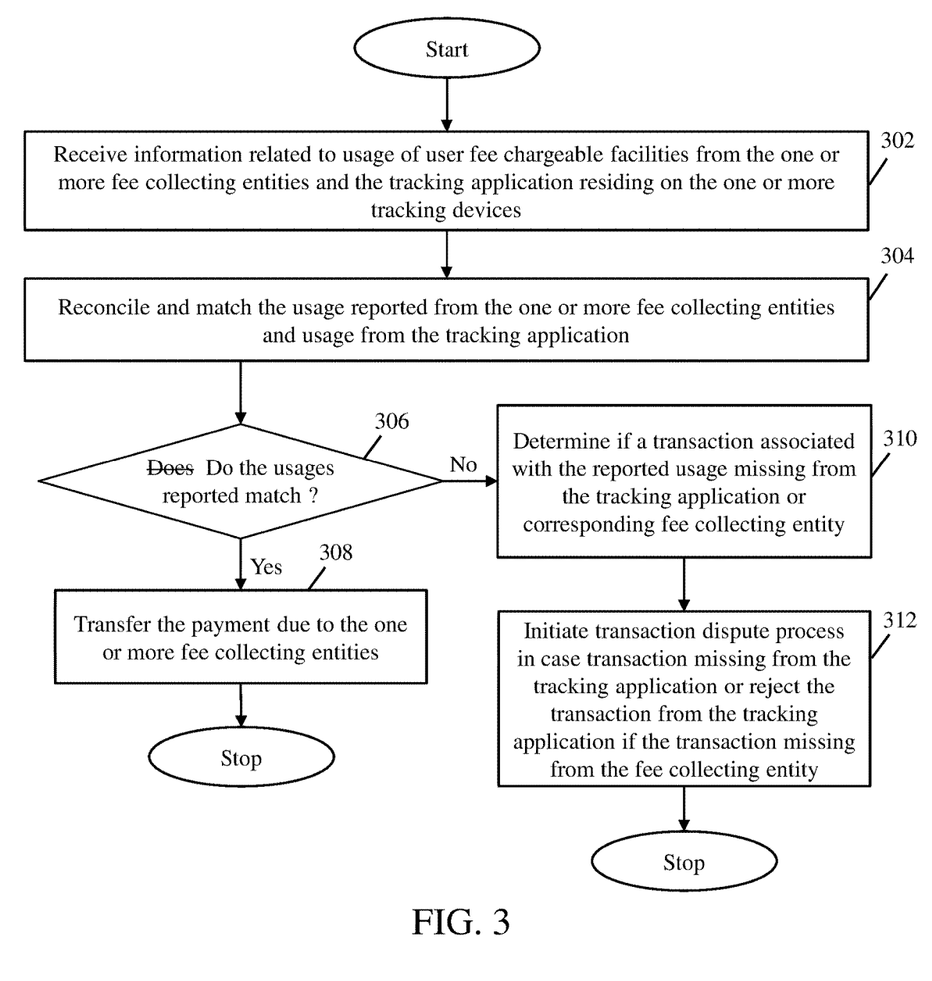
FIG. 3 is a flowchart illustrating a method for reconciling transactions corresponding to usage of user-fee chargeable facilities, in accordance with an embodiment of the present invention.

FIG. 3 is a flowchart illustrating a method for reconciling transactions corresponding to usage of user-fee chargeable facilities, in accordance with an embodiment of the present invention.

At 302, information related to usage of user fee chargeable facilities from the one or more fee collecting entities and the tracking application residing on the one or more tracking devices is received.

At 304, the usage reported from the one or more fee collecting entities and usage from the tracking application is reconciled and matched. In an embodiment of the present invention, the matching and reconciliation happens using appropriate descriptions related to the tracking device and/or the corresponding tracking application and/or the vehicle or other descriptions as applicable. In an embodiment of the present invention, the descriptions related to the one or more tracking devices comprise information such as, but not limited to, unique device identification number and vehicle details such as make, model, year, color, license plate number and jurisdiction of the vehicle.

At 306, a check is performed to determine if the usage reported from the one or more fee collecting entities and a corresponding usage from the tracking application matches. If it is determined that the usage reported from the one or more fee collecting entities match a corresponding usage from the tracking application then the method proceeds to 308. At 308, payment due to the one or more fee collecting entities corresponding to the reconciled and matched usage is transferred. If it is determined that the usage reported from the one or more fee collecting entities do not match a corresponding usage from the tracking application then the method proceeds to 310.

At 310, it is determined if a transaction associated with the reported usage is missing from the tracking application or from the fee collecting entity. At step 312, if it is determined that the transaction associated with the reported usage is missing from the tracking application then transaction dispute process is initiated. Alternately, if it is determined that the transaction associated with the reported usage is missing from the fee collecting entity then the transaction corresponding to the usage reported from the tracking application is rejected.

Figure 4:
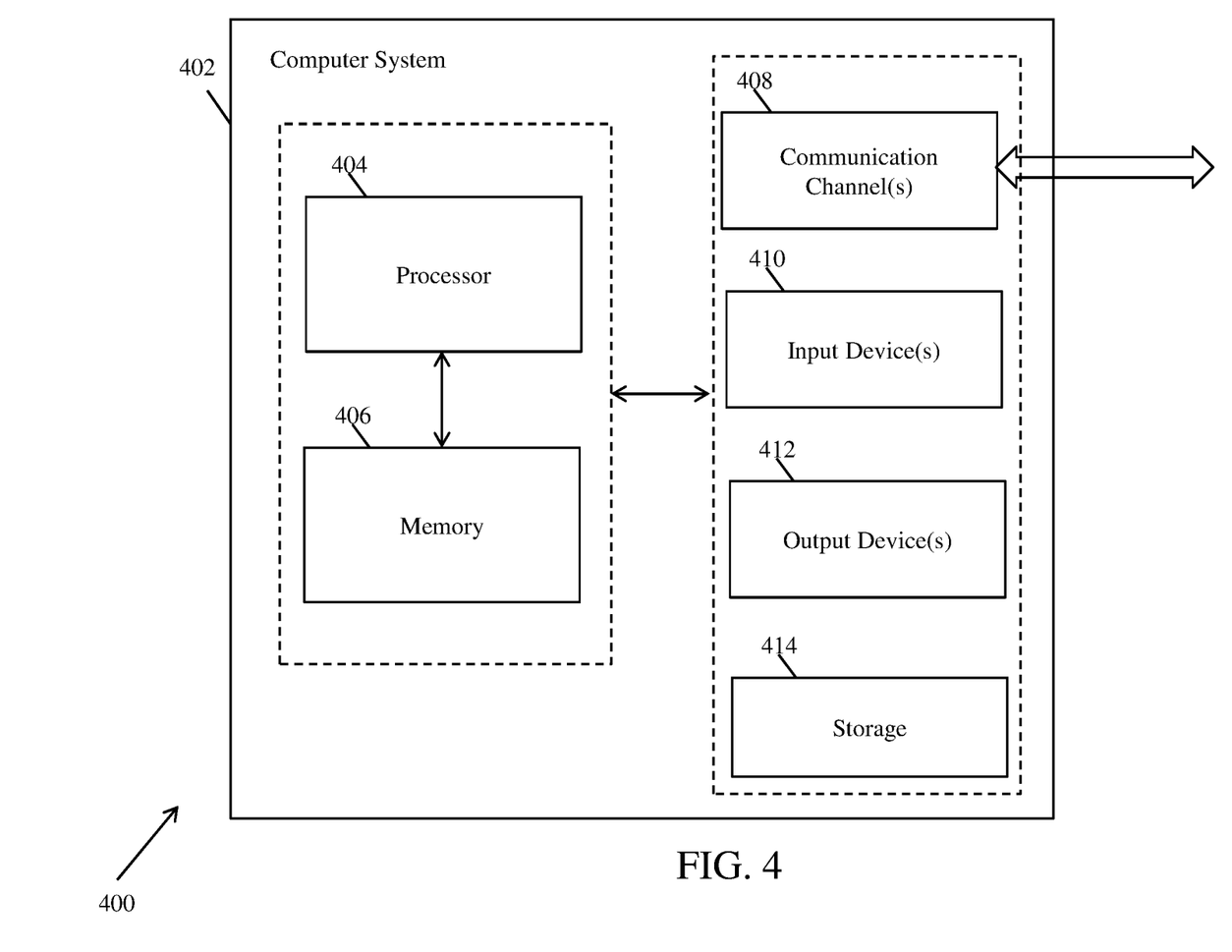
FIG. 4 illustrates an exemplary computer system for providing location based services for user-fee chargeable facilities, in accordance with an embodiment of the present invention.

FIG. 4 illustrates an exemplary computer system for providing location based services for user-fee chargeable facilities, in accordance with an embodiment of the present invention.

The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a smartphone, a tablet, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various software executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, touch screen, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments. In an embodiment of the present invention, the storage 414 is a database.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for providing location based services for user-fee chargeable facilities, the system comprising:
   a processor;
   a memory storing executable instructions that when executed by the processor causes the processor to perform the steps of:
   ascertaining fees for using one or more user-fee chargeable facilities received via a tracking application based on location of at least one of: one or more vehicles and one or more users, wherein the location of the one or more vehicles and the one or more users is determined using one or more tracking devices having location determination capabilities, and wherein a single interface receives the fees from the one or more users across multiple jurisdictions;
   sending one or more alerts, related to the fees, via one or more communication channels to at least one of: one or more electronic communication devices of the one or more users and one or more in-vehicle electronic communication devices, wherein the alerts are sent in a non-obstructive manner and time;
   providing one or more payment options related to usage of the user-fee chargeable facilities;
   interfacing with one or more third party facility providers offering contextually relevant personalized offers to the one or more users;
   processing payment options of the fees by mode other than electronic payment by leveraging the contextually relevant personalized offers based on usage history and user profile;
   computing revised fee for the one or more users, based on plurality of parameters comprising user profile, user virtual profile comprises user behavioral pattern, frequency of trips, the personalized offers accepted and frequent driver miles, or a combination thereof, in an event the payment options other than the electronic payment is selected for payment of the user-fee chargeable facilities;
   splitting payment between the one or more third party facility providers as well as the one or more user-fee chargeable facilities based on the revised fee computed in proportions in real time via the single interface, wherein the proportion is selected of a ratio computed by the processor, or ratio determined by the user, or a criteria based on the usage of user fee chargeable facilities and the personalized offers provided; and
   determining points accrued by the user from the personalized offers of the third party facility provider in an event the personalized offer is availed by the user, and compute pending points required to pay the fees, wherein in an event the points accrued are higher in value than the fees, the processor converts the accrued points into financial payment based on a conversion formulae;

matching and reconciling the usage of the one or more user-fee chargeable facilities received via the tracking application and transaction files received from one or more fee collecting entities, and wherein the processor matches and reconciles using descriptions related to at least one of the tracking device, corresponding tracking application and the vehicle;

wherein providing the one or more payment options related to the fees comprise making payment using a new or existing option for the electronic payment, making payment using frequent driver miles or points accrued through customer loyalty or affinity programs, accepting personalized discount or promotional offers from third-party partner(s) that are selected by analytical methods leveraging the unique virtual identity of the user in order to maximize the chances of availing the offers, purchasing goods or services in lieu of payment, visiting a location in lieu of payment, viewing an advertisement in lieu of payment, deferring payment to a later date and time, and denying responsibility for the payment obligation and reporting to appropriate authority.

2. The system of claim 1, wherein location based services for user-fee chargeable facilities comprise toll roads, pay-per-mile based taxable infrastructure, parking lots, bridges, tunnels, metro stations, entertainment venues, parks and transportation services.

3. The system of claim 1, wherein the one or more alerts related to the fees payable comprise text messages, smart assistant display, audio prompts, personal device smart assistants, in-vehicle smart assistants, instant messages and electronic mails.

4. A computer-implemented method for providing location based services for user-fee chargeable facilities, the computer-implemented method comprising:

determining, by a processor, location of at least one of: one or more vehicles and one or more users using one or more tracking devices having location determination capabilities;

ascertaining, by the processor, fees for using one or more user-fee chargeable facilities based on the determined location, wherein a single interface receives the fees from the one or more users across multiple jurisdictions;

sending, by the processor, one or more alerts, related to the fees, via one or more communication channels to at least one of: one or more electronic communication devices of the one or more users and one or more in-vehicle electronic communication devices, wherein the alerts are sent in a non-obstructive manner and time;

providing, by the processor, one or more payment options related to usage of the user-fee chargeable facilities;

interfacing, by the processor, with one or more third party facility providers offering contextually relevant personalized offers to the one or more users;

processing, by the processor, payment options of the fees by mode other than electronic payment by leveraging the contextually relevant personalized offers based on usage history and user profile;

computing, by the processor, revised fee for the one or more users, based on plurality of parameters comprising user profile, user virtual profile, frequency of trips, the personalized offers accepted and frequent driver miles, or a combination thereof, in an event the payment options other than the electronic payment is selected for payment of the one or more user-fee chargeable facilities;

splitting, by the processor, payment between the one or more third party facility providers as well as the one or more user-fee chargeable facilities based on the revised fee computed in proportions in real time via the single interface, wherein the proportion is selected of a ratio, or ratio determined by the user, or a criteria based on the usage of user fee chargeable facilities and the personalized offers provided, and determining, by the processor, points accrued by the user from the personalized offers of the third party facility provider in an event the personalized offer is availed by the user, and compute pending points required to pay the fees, wherein in an event the points accrued are higher in value than the fees, converting the accrued points into payment based on a conversion formulae;

matching and reconciling, by the processor, the usage of the one or more user-fee chargeable facilities received via the tracking application and transaction files received from one or more fee collecting entities, and wherein the processor matches and reconciles using descriptions related to at least one of the tracking device, corresponding tracking application and the vehicle;

wherein providing, by the processor, the one or more payment options related to the fees comprise making payment using a new or existing option for the electronic payment, making payment using frequent driver miles or points accrued through customer loyalty or affinity programs, accepting personalized discount or promotional offers from third-party partner(s) that are selected by analytical methods leveraging the unique virtual identity of the user in order to maximize the chances of availing the offers, purchasing goods or services in lieu of payment, visiting a location in lieu of payment, viewing an advertisement in lieu of payment, deferring payment to a later date and time, and denying responsibility for the payment obligation and reporting to appropriate authority.

5. The computer-implemented method of claim 4, wherein location based services for user-fee chargeable facilities comprise toll roads, pay-per-mile based taxable infrastructure, parking lots, bridges, tunnels, metro stations, entertainment venues, parks and transportation services.

6. The computer-implemented method of claim 4, wherein the one or more alerts related to the fees comprise text messages, smart assistant display, audio prompts, personal device smart assistants, in-vehicle smart assistants, instant messages and electronic mails.

* * * * *